US009500563B2

(12) United States Patent
Patrick et al.

(10) Patent No.: US 9,500,563 B2
(45) Date of Patent: Nov. 22, 2016

(54) SYSTEM AND METHOD FOR DETECTING AN AT-FAULT COMBUSTOR

(71) Applicant: General Electric Company, Schenectady, NY (US)

(72) Inventors: Romano Patrick, Marietta, GA (US); Matthew Francis Lemmon, Marietta, GA (US); Subrat Nanda, Houston, TX (US); Jonathan David White, Grand Baby, AL (US); Achalesh Kumar Pandey, Greenville, SC (US)

(73) Assignee: General Electric Company, Schenectady, NY (US)

( * ) Notice: Subject to any disclaimer, the term of this patent is extended or adjusted under 35 U.S.C. 154(b) by 477 days.

(21) Appl. No.: 14/097,540

(22) Filed: Dec. 5, 2013

(65) Prior Publication Data

US 2015/0160096 A1    Jun. 11, 2015

(51) Int. Cl.
*F23M 11/00* (2006.01)
*G01M 15/14* (2006.01)
*F23R 3/00* (2006.01)
(Continued)

(52) U.S. Cl.
CPC ............ *G01M 15/14* (2013.01); *F23M 11/00* (2013.01); *F23N 5/16* (2013.01); *F23N 5/242* (2013.01); *F23R 3/00* (2013.01); *F05D 2260/80* (2013.01); *F23N 2023/48* (2013.01); *F23N 2023/54* (2013.01); *F23N 2041/20* (2013.01); *F23R 2900/00005* (2013.01); *Y02T 50/677* (2013.01)

(58) Field of Classification Search
CPC ..................................................... F23M 11/00

USPC ......................................................... 702/35
See application file for complete search history.

(56) References Cited

U.S. PATENT DOCUMENTS

| 5,544,478 A | 8/1996 | Shu et al. |
| 6,354,071 B2 | 3/2002 | Tegel et al. |

(Continued)

FOREIGN PATENT DOCUMENTS

| EP | 2469041 | 6/2012 |
| EP | 2541145 A1 | 1/2013 |
| WO | WO 2013/077861 A1 | 5/2013 |

OTHER PUBLICATIONS

EPRI Success Story, Anomaly Detection Algorithm Helps NYPA Identify Incipient Failures, Leonard Angello, 2 pages.

(Continued)

*Primary Examiner* — Bryan Bui
(74) *Attorney, Agent, or Firm* — Dority & Manning, PA (57) ABSTRACT

A system for detecting an at-fault combustor includes a sensor that is configured to sense combustion dynamics pressure data from the combustor and a computing device that is in electronic communication with the sensor and configured to receive the combustion dynamics pressure data from the sensor. The computing device is programmed to convert the combustion dynamics pressure data into a frequency spectrum, segment the frequency spectrum into a plurality of frequency intervals, extract a feature from the frequency spectrum, generate feature values for the feature within a corresponding frequency interval over a period of time, and to store the feature values to generate a historical database. The computing device is further programmed to execute a machine learning algorithm using the historical database of the feature values to train the computing device to recognize feature behavior that is indicative of an at-fault combustor.

18 Claims, 6 Drawing Sheets

(51) Int. Cl.
*F23N 5/16* (2006.01)
*F23N 5/24* (2006.01)

(56) References Cited

U.S. PATENT DOCUMENTS

| | | | |
|---|---|---|---|
| 7,503,177 B2 * | 3/2009 | Bland | F01D 21/003 60/772 |
| 2002/0005037 A1 | 1/2002 | Tegel et al. | |
| 2004/0211187 A1 | 10/2004 | Catharine et al. | |
| 2006/0090471 A1 * | 5/2006 | Shah | F02C 9/28 60/772 |
| 2007/0214797 A1 * | 9/2007 | Bland | F01D 21/003 60/772 |
| 2013/0173181 A1 | 7/2013 | Shaikh et al. | |

OTHER PUBLICATIONS

Early warning detection to prevent combustor failures, Irwin Stambler, Gas Turbine World, Jul.-Aug. 2003, pp. 1-4.

* cited by examiner

SYSTEM AND METHOD FOR DETECTING AN AT-FAULT COMBUSTOR

FIELD OF THE INVENTION

The present invention generally involves a gas turbine. More specifically, the invention relates to a system and method for detecting an at-fault combustor during operation of the gas turbine.

BACKGROUND OF THE INVENTION

A turbomachine, such as a gas turbine, generally includes an inlet section, a compressor section, a combustion section that includes a plurality of combustors, a turbine section and an exhaust section. The inlet section cleans and conditions a working fluid (e.g., air) and supplies the working fluid to the compressor section. The compressor section progressively compresses the working fluid and supplies a high pressure compressed working fluid to the combustors where it is mixed with a fuel and burned in a combustion chamber to generate combustion gases having a high temperature and pressure. The combustion gases flow along a hot gas path into the turbine section where they expand to produce work. For example, expansion of the combustion gases in the turbine section may rotate a shaft connected to a generator to produce electricity.

Each combustor includes various combustion hardware components. For example, a conventional gas turbine combustor may include one or more fuel nozzles, a combustion liner, a cooling flow sleeve, a transition duct, an impingement sleeve, a cap assembly and/or various mounting hardware such as brackets and radial compression or hula seals. Over time, various factors including thermal cycling, vibrations and/or pressure pulses within the combustor may result in combustion component degradation, thus resulting in a combustor that operates outside of an acceptable performance range or that fails entirely. As a result, regularly scheduled outages for inspection and repair must be executed, thus affecting machine availability.

In order to achieve acceptable system durability and reliability, individual combustor and/or overall combustion system health should be carefully monitored and controlled between the scheduled outages. Therefore, a system and method for detecting and/or predicting an at-fault combustor during operation of the combustor would be useful.

BRIEF DESCRIPTION OF THE INVENTION

Aspects and advantages of the invention are set forth below in the following description, or may be obvious from the description, or may be learned through practice of the invention.

One embodiment of the present invention is a system for detecting an at-fault combustor. The system includes a combustor, a sensor that is configured to sense combustion dynamics pressure data from the combustor and a computing device that is in electronic communication with the sensor and configured to receive the combustion dynamics pressure data from the sensor. The computing device is programmed to convert the combustion dynamics pressure data into a frequency spectrum, segment the frequency spectrum into a plurality of frequency intervals, extract a feature from the frequency spectrum, generate feature values for the feature within a corresponding frequency interval over a period of time and to store the feature values to generate a historical database. The computing device is further programmed to execute a machine learning algorithm using the historical database of the feature values to train the computing device to recognize feature behavior indicative of an at-fault combustor.

Another embodiment of the present invention is a method for detecting an at-fault combustor using combustion dynamics pressure data and a computing device, comprising. The method includes receiving combustion dynamics pressure data at the computing device from a sensor in that is in electronic communication with a first combustor. The combustion dynamics pressure data of the first combustor is converted into a frequency spectrum and the frequency spectrum is segmented into a plurality of frequency intervals. A feature is extracted from the frequency spectrum and feature values that correspond to the feature within a corresponding frequency interval over a period of time are generated. The feature values may then be stored via the computing device to provide a historical database of the feature values. A machine learning algorithm is executed using the historical database of the feature values to train the computing device to recognize feature behavior that is indicative of an at-fault combustor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of an industrial/land based gas turbine for purposes of illustration, one of ordinary skill in the art will readily appreciate that embodiments of the present invention may be applied to any gas turbine such as an aircraft or marine gas turbine and are not limited to an industrial/land based gas turbine unless specifically recited in the claims.

Figure 1:
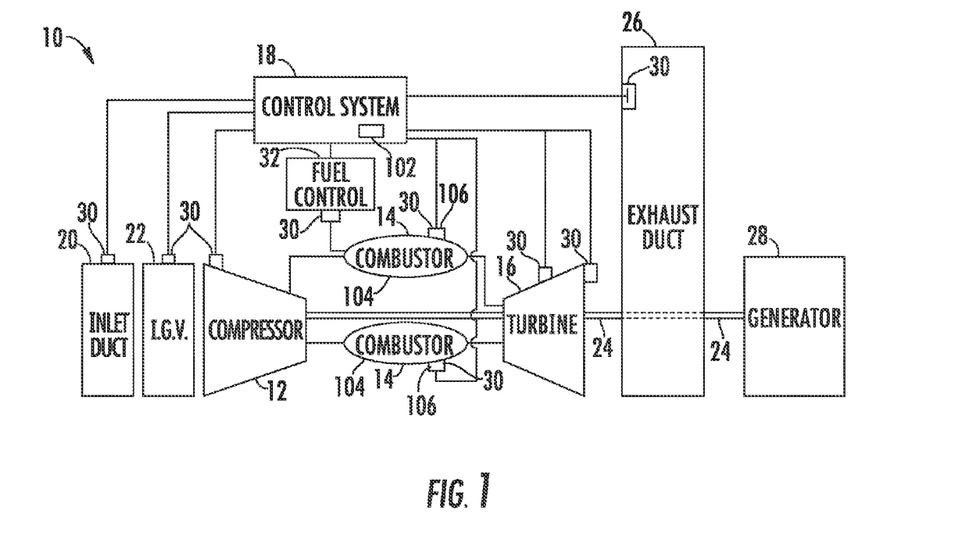
FIG. 1 is a functional block diagram of an exemplary gas turbine within the scope of the present disclosure.

With regards to the figures, FIG. 1 is a schematic diagram of a gas turbine 10 including a compressor 12, a combustion system including one or more combustors 14, a turbine 16 drivingly coupled to the compressor 12 and a controller or control system 18. An inlet duct 20 channels ambient air across one or more inlet guide vanes 22 and into the compressor 12. The compressor 12 progressively compresses the ambient air and directs the compressed air to the combustors 14 where it is mixed with a fuel and burned to produce combustion gases. The combustion gases are routed through the turbine 16, thus causing rotation of a shaft 24. The combustion gases may then be routed from an outlet of the turbine 16 into an exhaust duct 26 that may include various emission control and/or sound absorbing devices and/or a heat recovery system. The turbine 16 may drive a generator 28 via the shaft 24 to produce electrical power or other mechanical work.

In particular configuration, various sensors 30 are electronically coupled to the control system 18. The sensors 30 may include flow sensors, speed sensors, flame detector sensors, valve position sensors, guide vane angle sensors, temperature sensors, acoustic sensors, pressure sensors and/or other sensors that sense various parameters relative to the operation of the combustor 14 and/or the gas turbine engine system 10. A fuel control system 32 regulates the fuel flowing from a fuel supply to the combustor(s) 14, and controls the fuel split between fuel circuits that allow for flow control of the fuel into various fuel nozzles within each combustor 14. The fuel control system 32 also may select the type of fuel for the combustor 14, regulate the temperature of the fuel among other operations. The fuel control system 32 may be a separate unit or may be a component of the control system 18.

Figure 2:
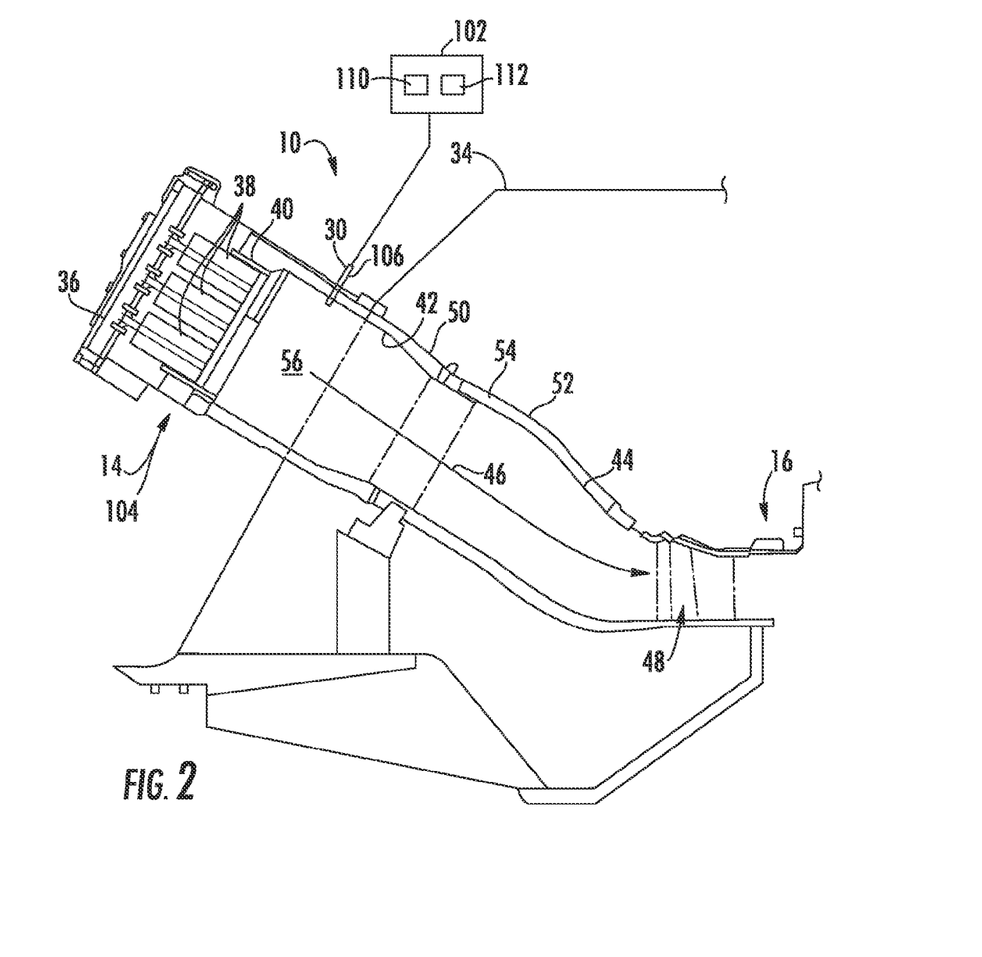
FIG. 2 is a cross sectioned side view of an exemplary combustor as may incorporate various embodiments of the present disclosure.

FIG. 2 provides a cross sectional side view of an exemplary combustor 14 as may incorporate various embodiments of the present invention. As shown, the combustor 14 is at least partially surrounded by a compressor discharge or outer casing 34. An end cover 36 is coupled to the outer casing 34. One or more fuel nozzles 38 extend generally axially downstream from the end cover 36 and partially through a fuel nozzle cap assembly 40. An annular liner such as a combustion liner 42 and/or a transition duct 44 extends downstream from the fuel nozzles 38 and/or the cap assembly 40 so as to define a hot gas path 46 for routing the hot combustion gases towards an inlet 48 to the turbine 16. An annular flow sleeve 50 may at least partially surround the combustion liner 42 and an annular impingement sleeve 52 may least partially surround the transition duct 44 so as to form an annular cooling flow passage 54 therebetween. A combustion chamber 56 is defined downstream from the fuel nozzles 38.

As used herein, a "no-fault" combustor corresponds to a combustor that is operating within an acceptable performance range. In contrast, an "at-fault" combustor corresponds to a combustor that is operating outside of the acceptable performance range or that has failed entirely. Overtime, various factors such as thermal stress and mechanical fatigue may degrade combustor performance and/or reliability which may eventually lead to an at-fault combustor. Thus, to achieve acceptable system durability and reliability, individual combustor and/or overall combustion system health should be carefully monitored and controlled. The present disclosure provides a system and method for detecting and/or predicting an at-fault combustor based on real time combustion dynamics data captured during operation of the combustor.

Figure 3:
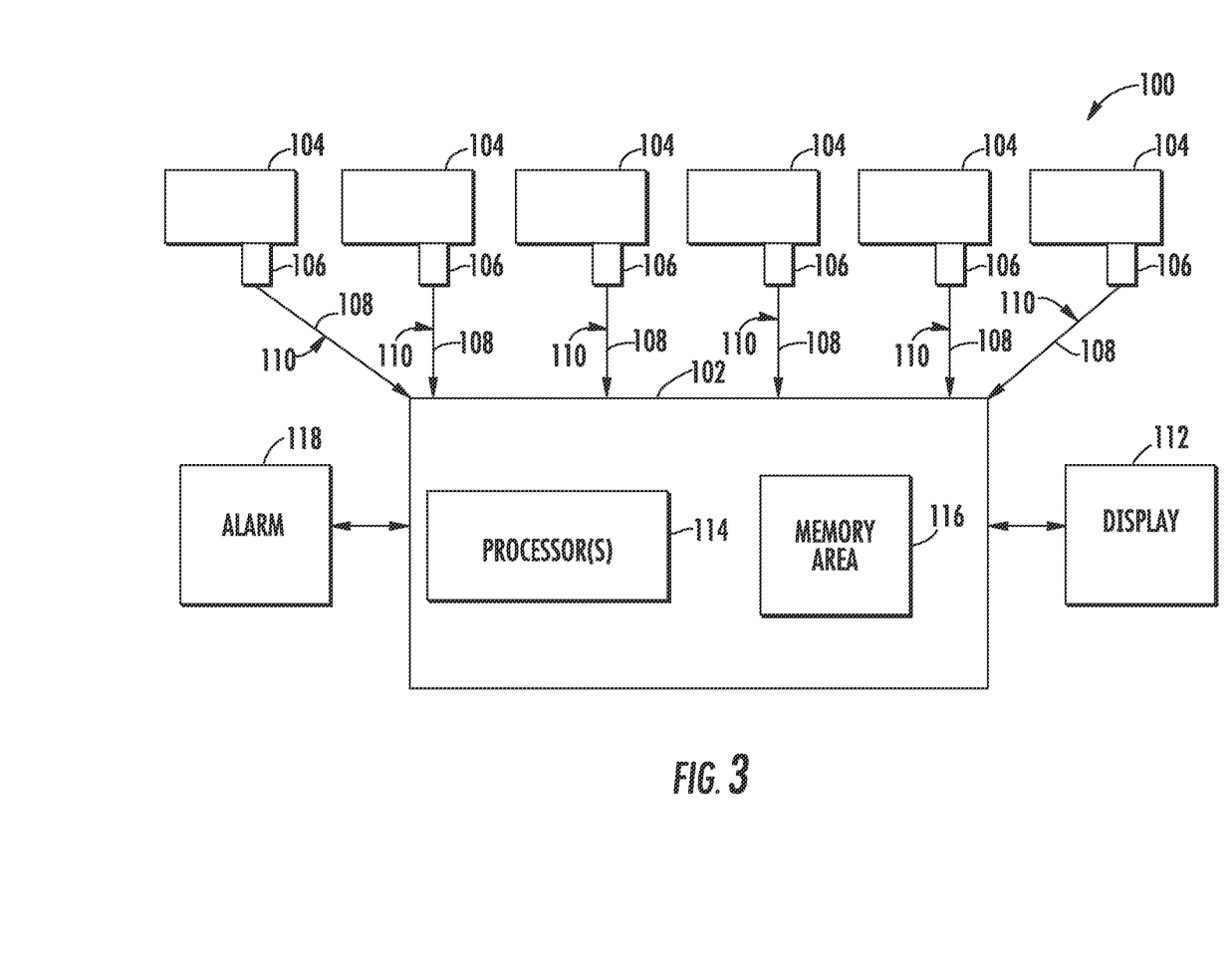
FIG. 3 is a block diagram of a system for detecting an at-fault combustor, according to at least one embodiment of the present disclosure.

FIG. 3 is a block diagram of a system for detecting an at-fault combustor 14 herein referred to as "system 100", according to at least one embodiment of the present invention. In one embodiment, the system 100 includes a computing device 102, a combustor 104 and a sensor 106 that is coupled to the combustor 104 and in electronic communication with the computing device 102.

In particular embodiments, the combustor 104 may be configured the same or similar to the combustor 14 as illustrated and described in FIG. 2. Although the system 100 is generally described as having one combustor 104 and one sensor 106 and FIG. 3 illustrates the system as having six combustors 104 and six sensors 106, one of ordinary skill in the art guided by the teachings herein will appreciate that embodiments of the system 100 are not limited to configurations with one combustor 104 and one sensor 106 or six combustors 104 and six sensors 106. Rather, the system 100 may include any number of combustors 104 and/or sensors 106 that are in communication with the computing device 102.

In one embodiment, the sensor 106 is configured to sense and/or measure static and/or dynamic pressure within the combustor 104. For example, in one embodiment, the sensor 106 comprises a dynamic pressure sensor or dynamic pressure probe configured to sense or measure combustion dynamics pressure data 110 from the combustor 104. The sensor 106 is configured to transmit or communicate a signal 108 that is indicative of the combustion dynamics pressure data 110 to the computing device 102. For example, the sensor 106 may be coupled to a wireless device that is in communication with the computing device 102 or may be wired to the computing device 102.

The computing device 102 as is described herein, includes one or more processors or processing units, system memory, and some form of computer readable media. The computing device 102 may be a separate component or may be integrated into the control system 18. By way of example and not limitation, the computer readable media may include computer storage media and communication media. Computer storage media may include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and may include any information delivery media. Combinations of any of the above are also included within the scope of computer readable media.

The computing device 102 may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment.

Examples of well-known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the present disclosure may be described in the general context of computer-executable instructions or algorithms, such as program modules, executed by one or more computers or other devices. The algorithms may be organized into one or more computer-executable components or modules. Generally, program modules include, but are not limited to, routines, programs, objects, components, and data structures that perform particular tasks or implement particular abstract data types.

Aspects of the present disclosure may be implemented with any number and organization of such components or modules. For example, aspects of the present disclosure are not limited to the specific algorithms or the specific components or modules illustrated in the figures and described herein. Other embodiments of the present disclosure may include different algorithms or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices. Aspects of the present disclosure may transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In one embodiment, as shown in FIG. 3, the computing device 102 includes a display 112, at least one processor 114, and a memory or data storage portion 116. The display 112 may be, for example, a capacitive touch screen display that is integrated into computing device 102 or that is external to the computing device 102. User input functionality may be provided in the display 112 which acts as a user input selection device. In one embodiment, the computing device may include and/or be in communication with an alarm 118.

Figure 4:
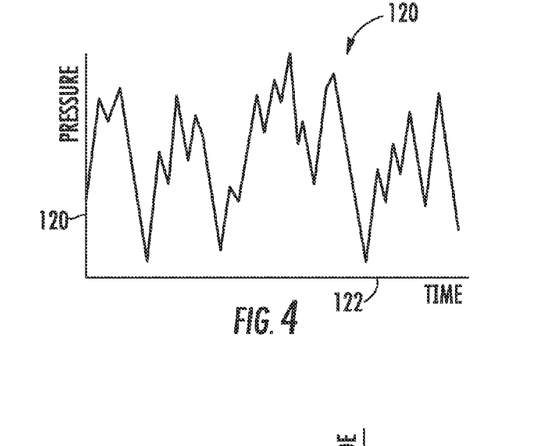
FIG. 4 is a graphical illustration of exemplary combustion dynamics data measured as pressure with respect to frequency, according to the present disclosure.

In one embodiment, the computing device 102 is configured to receive the signal 108 comprising the combustion dynamics pressure data 110 from the sensor 106. For example, the computing device 102 may communicate with the sensor 106 via a wired and/or a wireless connection. The combustion dynamics pressure data 110 is generally received as pressure values 120 and the computing device 102 may be programmed to track the pressure values 120 with respect to time 122 as illustrated in FIG. 4.

Figure 5:
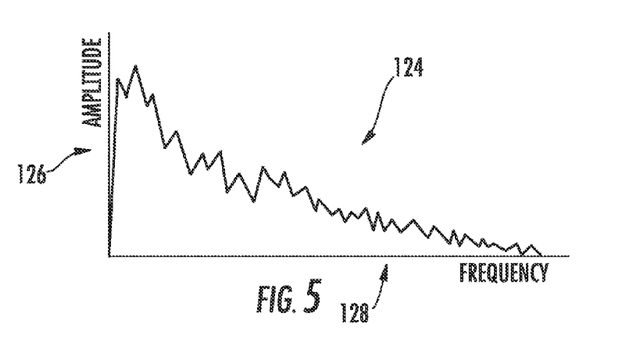
FIG. 5 is a graphical illustration of an exemplary frequency spectrum generated from the combustion dynamics data as shown in FIG. 4, measured as amplitude with respect to frequency, according to the present disclosure.

In one embodiment, the computing device 102 is programmed to convert the combustion dynamics pressure data 110 into a frequency spectrum 124 which includes amplitude 126 with respect to frequency 128, as illustrated in FIG. 5. This may be accomplished by executing one or more known algorithms via the computing device 102.

Figure 6:
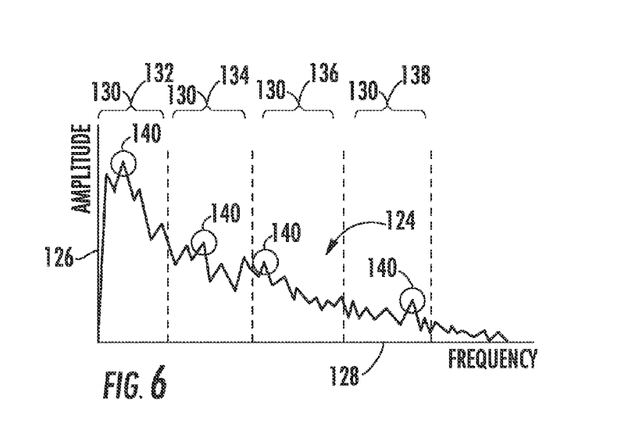
FIG. 6 is a graphical illustration of an exemplary frequency spectrum as shown in FIG. 5, segmented into frequency intervals according to one embodiment of the present disclosure.

In one embodiment, the computing device 102 is programmed to segment the frequency spectrum 124 into frequency intervals 130 or "buckets" which correlate to certain performance and/or dynamic behaviors of the combustor 104 and/or the gas turbine 10, as illustrated in FIG. 6. As should be obvious to one of ordinary skill in the art, this may be accomplished via any algorithm for segmenting data points know to one of ordinary skill in the art that is executable by the computing device 102.

As the fuel and air mixture is burned in the combustor 104, various operating parameters of the gas turbine 10 such as fuel temperature, fuel type, fuel air splits, ambient air conditions, combustor hardware configuration, combustor hardware condition and operating mode or operating condition of the gas turbine generally effect the dynamic behavior of the combustor such as the combustion dynamic pressure pulsations or pressure waves within the combustor 14. The pressure waves have defined amplitudes and frequencies that correspond with natural acoustic modes or tones of the combustion system and/or the individual combustors 104. As a result, the effects on the dynamics behavior of the combustor(s) 104 may be directly reflected in the combustion dynamics pressure data 120 sensed by the sensor(s) 106.

In particular embodiments, as illustrated in FIG. 6, the frequency intervals 130 may be segmented based on the various acoustic modes or tones. For example, in one embodiment, the intervals 130 may be segmented as blowout tone 132, low tone 134, medium tone 136 and high tone 138. By way of example, the blowout tone 132 may correspond to a frequency interval range between about zero hertz and about fifty hertz, the low tone 134 may correspond to a frequency range between about fifty hertz and about one hundred hertz, the medium tone 136 may correspond to a frequency range between about one hundred hertz and about five hundred hertz, and the high tone 138 may correspond to a frequency range greater than about five hundred hertz.

The combustion dynamics pressure data 110 may be collected at a high frequency sample rate, in some cases in the order of tens of thousands of samples per second or sampling rate in tens of kHz. As a result, large amounts of combustion dynamics pressure data points are generated which corresponds to large amounts of data points within the frequency spectrum 124. In one embodiment, the computing device 102 is programmed to execute a computer algorithm such as a "maximum peak picking" or "down sampling" operation in order to reduce the number of frequency data points within the frequency spectrum within each frequency interval 130.

In one embodiment, as illustrated in FIG. 6, the maximum peak picking operation identifies maximum amplitude 140 at a particular frequency 128 within a particular frequency interval 130. The computing device 102 may store the maximum amplitude 140 and the corresponding frequency 128, which may be referred to as a peak pair, for each frequency interval 130. The maximum peak picking algorithm may generate a timestamp for the maximum amplitude 140 and the corresponding frequency 128 and/or may identify a family of parameters that describe the operating condition or mode of the combustor 104 and/or the gas turbine 10. In particular embodiments, there is one peak pair per each frequency interval 130 at a corresponding timestamp or operating condition descriptor.

In one embodiment, the computing device 102 is programmed to extract a "feature" or a plurality of features from the frequency spectrum 124 and/or from one or more of the frequency intervals 130. For example, the computing device 102 may be programmed to execute a feature extraction algorithm. The feature extraction algorithm may extract a feature by performing various operations on one or more peak pair(s) (amplitude+frequency) within a corresponding frequency interval 130. For example, the operation on the peak pair(s) may include measuring a moving average over time or normalizing a trend. In addition or in the alternative, the feature may be generated by combining the peak pair(s) across the frequency intervals 130.

The feature may comprise, for example but not by limitation, a mathematical transformation or a calculation of statistics of the peaks. In one embodiment, the feature is generally based on the physics of the combustor 104 which may have a direct or indirect effect on the combustion dynamics pressure data 110 collected from the combustor 104. For example, the feature may be based on combustor hardware configuration, combustor hardware components, combustor type, vibration intensities, orientation of the combustor on the gas turbine 10 or the number of combustors on the gas turbine 10.

Figure 7:
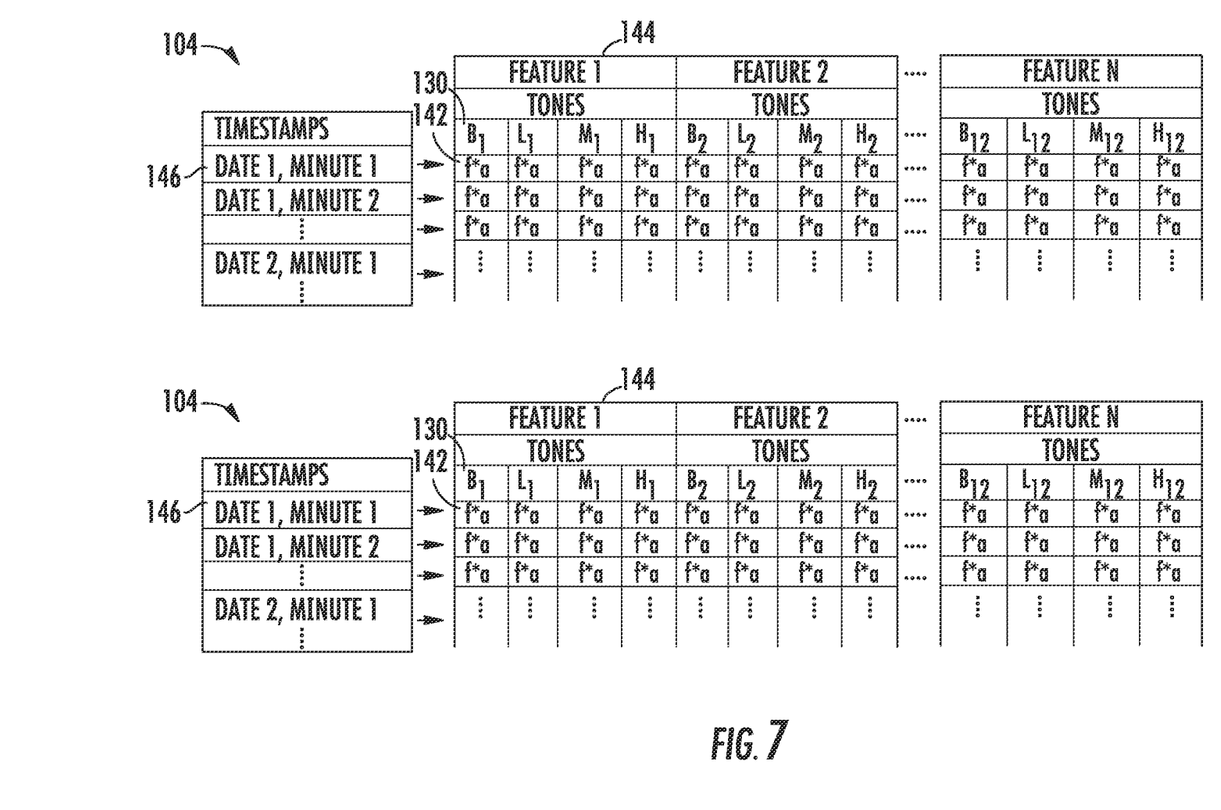
FIG. 7 is an illustration of exemplary tables or lists generated by a computing device representing feature values of features extracted from combustion dynamics data as shown in FIG. 6, according to one embodiment of the present disclosure.

In one embodiment, as illustrated in FIG. 7, the computing device 102 is programmed to generate feature values 142 for the extracted feature 144 within a corresponding frequency interval 130 over a period of time. The feature values 142 may be the product of the amplitude and frequency of the peak pair(s) or may be the sum of the amplitude and frequency of the peak pair(s), or may be any other value extracted from the peak pair. As shown, the computing device 102 may provide a time stamp 146 for each feature value 142 generated or calculated.

The feature 144 maintains several important relationships with the original peak pair(s). For example, the feature 144 corresponds to an individual combustor 104, it corresponds to a specific frequency interval 130 and the feature 144 corresponds to a time stamp and/or a turbine operating condition or mode. In this manner, the computing device 102 may be programmed to create lists, tables or matrices as illustrated in FIG. 7, which track behavior of the feature 144 and/or the feature values 142 over time. As illustrated, the computing device 102 may be programmed to generate and track feature values for multiple features over time and may be programmed to generate and track feature values for multiple combustors 104 coupled to a common gas turbine 10.

In one embodiment, the computing device 102 is programmed to electronically store the feature values 142, thus providing a historical database of the feature values 142. For example, the memory 112 may be used to store the feature values 142. In particular embodiments, the memory 112 also may be used to store combustor history data, user defined thresholds, and acoustic vibration data.

In one embodiment, the computing device 102 also may be programmed to generate one or more statistical features which are based on various operational parameters of the combustor 104 and/or the gas turbine 10, including but not limited to exhaust gas temperature, combustion valve settings, gas turbine load or operating condition, combustor firing temperature, fuel temperature, fuel split and fuel type. In addition or in the alternative, the statistical feature may be based in part on the historical database of the feature values. The statistical feature(s) may provide data that may be related to generic differences between operational profiles of no-fault and at-fault combustors 104. The statistical feature(s) may be based on statistical averages, trends, outliers or the like.

In one embodiment, the computing device 102 is programmed to execute a machine learning algorithm. The machine learning algorithm can be executed on-line or in real time to assess the condition of combustor or combustors while in operation. The machine learning algorithm trains the computing device 102 to recognize feature behavior that is indicative of a no-fault combustor and an at-fault combustor.

In one embodiment, where the historical database includes feature values and/or the computing device 102 contains data that is indicative of no-fault combustor operation and at-fault combustor operation, the machine learning algorithm may include a supervised training algorithm to train the computing device 102 to recognize feature behavior indicative of a no-fault combustor and an at-fault combustor. The machine learning algorithm may include logistic regression, neural networks, support vector machines or the like.

In one embodiment, the machine learning algorithm utilizes an unsupervised training algorithm to find anomalous behaviors in the combustor and/or multiple combustors of the gas turbine such as clustering or k-means classification. The unsupervised training algorithm may be used when it is unknown how a combustor fault will manifest in the combustion dynamics data, but it is predicted that the anomalous behavior may be indicative of an at-fault combustor.

Once the computing device 102 has been trained using the machine learning algorithms, features extracted from combustion dynamics data 110 from other combustors of other gas turbines while in service or while in operation may be entered or inputted into the computing device 102. In this manner, at-fault combustor behavior may be predicted or detected before the combustor 104 fails. Such detection algorithm for different possible faults can in turn trigger distinct safe, convenient or timely inspection, maintenance, or control operations of the turbine.

Figure 8:
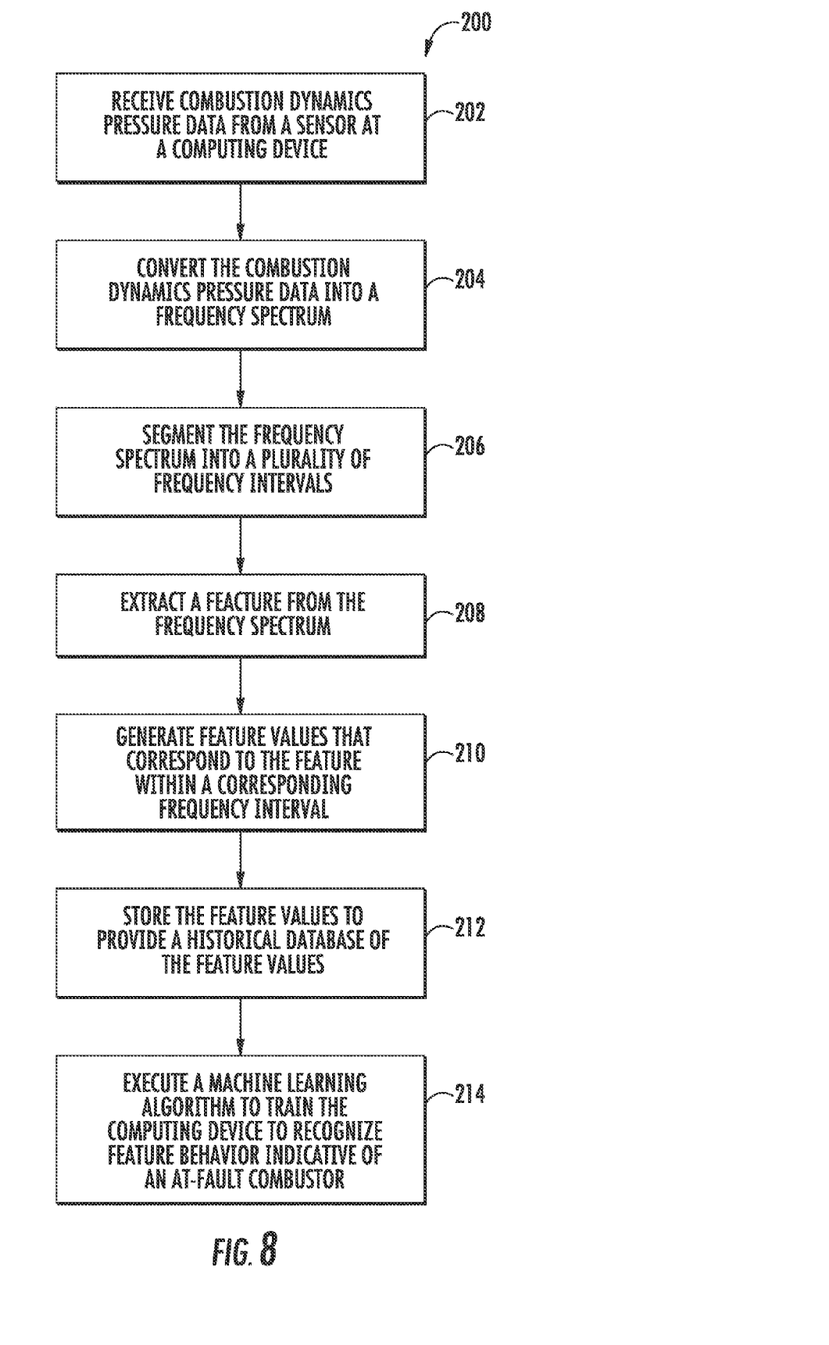
FIG. 8 is a flow diagram of a method for detecting an at-fault combustor using combustion dynamics pressure data.

The various embodiments as described and as illustrated herein provide a method 200 for detecting an at-fault combustor using combustion dynamics pressure data 110 from a first combustor 104 and the computing device 102. As shown in FIG. 8, at step 202, the method 200 includes receiving the combustion dynamics pressure data 110 at the computing device 102 from a sensor 106 coupled to the first combustor 104. At step 204, the method includes converting the combustion dynamics pressure data 110 of the first combustor 104 into the frequency spectrum 124. At step 206, the method 200 includes segmenting the frequency spectrum 124 into a plurality of frequency intervals 130. At step 208, the method includes extracting a feature 144 from the frequency spectrum 124.

At step 210, the method 200 includes generating feature values that correspond to the feature within a corresponding frequency interval. At step 212, the method 200 includes storing the feature values to provide a historical database of the feature values. At step 214, the method 200 includes executing a machine learning algorithm using the historical database of the feature values to train the computing device to recognize feature behavior indicative of an at-fault combustor.

In one embodiment, wherein the historical database comprises feature values indicative of no-fault combustor operation and at-fault combustor operation, step 214 may include executing a supervised training algorithm. In one embodiment, wherein the historical database comprises anomalous feature values, step 214 may include executing an unsupervised training algorithm. In one embodiment, step 214 may be performed in real time during operation of the first combustor 104.

In one embodiment, the method 200 may further include converting combustion dynamics pressure data of a second combustor into a frequency spectrum, segmenting the frequency spectrum into a plurality of frequency intervals, extracting a feature from the frequency spectrum that corresponds to the feature extracted from the first combustor, generating a feature value for the feature over a period of time, where the feature value is generated within the same frequency interval as the frequency interval of the first combustor, and comparing behavior of the feature of the second combustor to the behavior of the feature of the first combustor to detect and/or predict at-fault combustor operation of the second combustor. The step of comparing the behavior of the feature of the second combustor to the behavior of the feature of the first combustor is executed during operation of the second combustor.

The method may further include storing the feature values of the second combustor to generate a historical database of the feature values of the second combustor and executing a machine learning algorithm using the historical database of the feature values of the second combustor. Where the historical database of the feature values of the second combustor comprises feature values that correspond to no-fault combustor operation and at-fault combustor operation, executing the machine learning algorithm may include executing a supervised training algorithm. Where the historical database of the feature values of the second combustor comprises anomalous feature values, executing the machine learning algorithm may comprises executing an unsupervised training algorithm. The method may further include executing the machine learning algorithm in real time during operation of the second combustor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for detecting an at-fault combustor, comprising:

a combustor;

a sensor configured to sense combustion dynamics pressure data from the combustor; and a computing device in communication with the sensor and configured to receive the combustion dynamics pressure data from the sensor, the computing device programed to:

convert the combustion dynamics pressure data into a frequency spectrum;

segment the frequency spectrum into a plurality of frequency intervals;

extract a feature from the frequency spectrum;

generate feature values for the feature within a corresponding frequency interval over a period of time;

electronically store the feature values to provide a historical database of the feature values;

execute a machine learning algorithm using the historical database of the feature values to train the computing device to recognize feature behavior indicative of an at-fault combustor;

convert the combustion dynamics pressure data of a second combustor into a second frequency spectrum;

segment the second frequency spectrum into a plurality of frequency intervals;

extract a feature from the second frequency spectrum that corresponds to the feature extracted from the first combustor;

generate a feature value for the feature from the second frequency spectrum over a period of time, wherein the feature value is generated within the same frequency interval as the frequency interval of the first combustor; and compare behavior of the feature of the second combustor to the behavior of the feature of the combustor;

wherein the computing device adjusts operation or indicates that maintenance is required for at least one of the first combustor and the second combustor based on a detection of anomalous behavior between the behavior of the feature of the second combustor and the behavior of the feature of the first combustor is detected, wherein anomalous behavior between the behavior of the feature of the second combustor and the behavior of the feature of the first combustor indicates an at-fault combustor.

2. The system as in claim 1, wherein the feature values are based on peak amplitude measured at a corresponding frequency within the corresponding frequency interval.

3. The system as in claim 1, wherein each frequency interval corresponds to a combustor tone.

4. The system as in claim 1, wherein the computing device is programed to time stamp each generated feature value.

5. The system as in claim 1, wherein the combustor is coupled to a gas turbine, the feature corresponding to an operating mode of the gas turbine.

6. The system as in claim 1, wherein the combustor is coupled to a gas turbine, the computing device being programed to generate a statistical feature value based on at least one of the historical database of the feature values and various operational parameters of a gas turbine.

7. The system as in claim 1, wherein the machine learning algorithm comprises an unsupervised training algorithm.

8. The system as in claim 1, wherein the historical database comprises feature values that are indicative of no-fault combustor operation and at-fault combustor operation.

9. The system as in claim 8, wherein the machine learning algorithm comprises a supervised training algorithm.

10. A method for detecting an at-fault combustor using combustion dynamics pressure data and a computing device, comprising;
receiving combustion dynamics pressure data at the computing device from a sensor in communication with a first combustor;
converting the combustion dynamics pressure data of the first combustor into a frequency spectrum;
segmenting the frequency spectrum into a plurality of frequency intervals;
extracting a feature from the frequency spectrum;
generating a feature value that corresponds to the feature within a corresponding frequency interval over a period of time;
storing the feature values to provide a historical database of the feature values;
executing a machine learning algorithm using the historical database of the feature values to train the computing device to recognize feature behavior indicative of an at-fault combustor;
converting the combusting dynamics pressure data of a second combustor into a second frequency spectrum;
segmenting the second frequency spectrum into a plurality of frequency intervals;
extracting a feature from the second frequency spectrum that corresponds to the feature extracted from the first combustor;
generating a feature value for the feature from the second frequency spectrum over a period of time, wherein the feature value is generated within the same frequency interval as the frequency interval of the first combustor;
comparing behavior of the feature of the second combustor to the behavior of the feature of the first combustor, wherein anomalous behavior between the behavior of the feature of the second combustor and the behavior of the feature of the first combustor indicates one or both of the first combustor and the second combustor is an at-fault-combustor; and
adjusting operation or scheduling maintenance for at least one of the first combustor and the second combustor where anomalous behavior between the behavior of the feature of second combustor and the behavior of the feature of the first combustor is detected.

11. The method as in claim 10, wherein the historical database comprises feature values indicative of no-fault combustor operation and at-fault combustor operation, wherein the step of executing a machine learning algorithm comprises executing a supervised training algorithm.

12. The method as in claim 10, wherein the historical database comprises anomalous feature values, wherein the step of executing a machine learning algorithm comprises executing an unsupervised training algorithm.

13. The method as in claim 10, wherein the step of executing a machine learning algorithm is performed in real time during operation of the combustor.

14. The method as in claim 10, wherein the step of comparing the behavior of the feature of the second combustor to the behavior of the feature of the first combustor is executed during operation of the second combustor.

15. The method as in claim 10, further comprising storing the feature values of the second combustor to generate a historical database of the feature values of the second combustor and executing a machine learning algorithm using the historical database of the feature values of the second combustor.

16. The method as in claim 15, wherein the historical database of the feature values of the second combustor comprises feature values that correspond to no-fault combustor operation and at-fault combustor operation, wherein executing a machine learning algorithm comprises executing a supervised training algorithm.

17. The method as in claim 15, wherein the historical database of the feature values of the second combustor comprises anomalous feature values, wherein executing a machine learning algorithm comprises executing an unsupervised training algorithm.

18. The method as in claim 15, wherein the step of executing a machine learning algorithm is carried out in real time during operation of the second combustor.

* * * * *